United States Patent
Yzuel Sanz

(10) Patent No.: US 10,568,334 B2
(45) Date of Patent: Feb. 25, 2020

(54) METHOD FOR PREPARING FROZEN OR REFRIGERATED FRIED EGGS

(71) Applicant: Innovation Foods 360 S.L., Madrid (ES)

(72) Inventor: Francisco Javier Yzuel Sanz, Vitoria-Gasteiz (ES)

(73) Assignee: INNOVATION FOODS 360 S.L., Madrid (ES)

( * ) Notice: Subject to any disclaimer, the term of this patent is extended or adjusted under 35 U.S.C. 154(b) by 0 days.

(21) Appl. No.: 15/323,253

(22) PCT Filed: Dec. 30, 2015

(86) PCT No.: PCT/ES2015/070967
§ 371 (c)(1),
(2) Date: Dec. 30, 2016

(87) PCT Pub. No.: WO2017/114983
PCT Pub. Date: Jul. 6, 2017

(65) Prior Publication Data
US 2019/0008175 A1   Jan. 10, 2019

(51) Int. Cl.
*A23L 1/32* (2006.01)
*A23B 5/04* (2006.01)
(Continued)

(52) U.S. Cl.
CPC ........... *A23B 5/041* (2013.01); *A23L 3/36* (2013.01); *A23L 5/12* (2016.08); *A23L 15/00* (2016.08); *A23L 15/30* (2016.08); *A23L 5/10* (2016.08)

(58) Field of Classification Search
CPC . A23V 2300/24; A23V 2002/00; A23L 15/00; A23L 1/32; A23L 3/36;
(Continued)

(56) References Cited

U.S. PATENT DOCUMENTS

| 5,620,735 A | 4/1997 | Manderfeld et al. |
| 7,288,279 B2* | 10/2007 | Merkle ............ A23B 5/04 426/614 |

(Continued)

FOREIGN PATENT DOCUMENTS

GB   2109670   6/1983

OTHER PUBLICATIONS

Leite's Culinaria, Baked Eggs, p. 14 Retrieved online Feb. 3, 2018 https://leitesculinaria.com/96610/recipes-baked-eggs.html (Year: 2014).*

(Continued)

*Primary Examiner* — Hong T Yoo
(74) *Attorney, Agent, or Firm* — Wenderoth, Lind & Ponack, L.L.P.

(57) ABSTRACT

A method for preparing frozen or refrigerated fried eggs from whole, fresh eggs, the method comprising: breaking whole, fresh eggs (1) into a support (3) impregnated with edible fat; introducing the support (3) carrying the broken whole fresh eggs (2) into an oven (4) comprising ventilation means; heating the oven until the inner part of the yolk of the broken whole fresh eggs reaches a temperature of 65 to 73° C.; taking said support carrying the eggs out of the oven, wherein said eggs are fried eggs; cooling the fried eggs for reducing their residual heat in order to prevent the inner part of the yolk to exceed 73° C.; freezing or refrigerating the cooled fried eggs.

16 Claims, 4 Drawing Sheets

(51) Int. Cl.
*A23L 3/36* (2006.01)
*A23L 15/00* (2016.01)
*A23L 5/10* (2016.01)

(58) Field of Classification Search
CPC ... A23L 15/30; A23L 3/44; A23L 5/15; A23B 5/041; A23P 30/10; A23P 1/10
See application file for complete search history.

(56) References Cited

U.S. PATENT DOCUMENTS

| 2003/0118714 | A1 | 6/2003 | Merkle et al. | |
|---|---|---|---|---|
| 2005/0136172 | A1 | 6/2005 | Hairsine et al. | |
| 2007/0087106 | A1* | 4/2007 | Tillis | A23L 15/00 426/614 |
| 2015/0272193 | A1 | 10/2015 | Izuel Sanz | |

OTHER PUBLICATIONS

Bengtsson, Nils, "Ultrafast Freezing of Cooked Egg White," Food Technology, Institute of Food Technologists, Chicago, IL, vol. 21, Sep. 1967, pp. 95-97.

* cited by examiner

METHOD FOR PREPARING FROZEN OR REFRIGERATED FRIED EGGS

TECHNICAL FIELD

The present invention relates to the field of foodstuffs industry. More precisely, it relates to methods for preparing frozen or refrigerated fried eggs with application in the foodstuffs industry.

STATE OF THE ART

There have been several attempts to industrially produce frozen fried eggs that can be later heated, for example within a microwave or other oven, for consumption by a person.

A first approach can be found in U.S. Pat. No. 5,620,735, which discloses methods for producing a simulated egg patty and methods for producing a simulated egg yolk. These methods are based on separating an egg yolk from the egg white of an egg, treating the egg yolk, in particular freezing the egg yolk, combining the frozen egg yolk with an amount of egg white and cooking the combined frozen egg yolk and egg white to obtain a simulated egg patty. The resulting patty is referred to as a "simulated egg" because it has the appearance of an egg but it is not a real egg, and therefore not a fried egg nor a frozen fried egg, since it is the result of the independent manipulation (and freezing of the egg yolk) of the two elements forming an egg (yolk and white), which have been previously unstructured.

A similar approach is disclosed in US2003/0118714A1, wherein the production of a formulated fried egg is described. Like in the previous disclosure, the egg white and the egg yolk are separated from each other, thus unstructuring the original egg, and independently, manipulated until the two independently manipulated portions (liquid egg yolk and liquid white egg) are combined and cooked together. Additives are added to the liquid egg yolk in order to simulate the appearance of a natural egg. Therefore, the resulting product is neither a real egg, but a so-called formulated fried egg. Like in the previous disclosure, the egg white and egg yolk are treated separated due to the unsolved problem of frying a whole egg and freezing the fried whole egg for its later packaging and commercialization.

A method of making pre-cooked eggs starting from a real egg, that is to say, without splitting egg yolk and egg white for independent manipulation of these split parts, is for example disclosed in US2005/136172A1. In this document, a method for producing cooked, cooled eggs having a grill fried egg appearance and machinery for producing these eggs are disclosed. The liquid egg product is deposited on a grill and cooked to a minimum temperature of 77° C. (170° Fahrenheit). The cooked egg is then cooled (i.e. frozen or refrigerated). At the time of consumption, the egg has an appearance of grill egg.

US2015/0272193A1 discloses a method for preparing frozen fried eggs starting from whole, fresh eggs. The eggs are broken into a mold impregnated with oil and introduced into a convection oven at a temperature of 232 to 252° C. for a period of 130 to 150 seconds. The eggs are then introduced into a blast chiller, after which they are packed. However, although the appearance of the egg when it is taken out of the convection oven is that of a fried egg, it has been observed that it cannot be guaranteed that the egg yolk is not in liquid form, such as having a gel texture.

In sum, none of the cited methods manage to produce fried eggs starting from fresh eggs which can later be refrigerated or frozen for their subsequent industrial distribution. Therefore, there is a need for a method for preparing frozen or refrigerated fried eggs obtained from whole, fresh eggs.

DESCRIPTION OF THE INVENTION

It is an object of the invention to provide a method for preparing frozen or refrigerated fried eggs obtained from whole, fresh eggs. In the present method, fresh eggs (also referred to as natural eggs) are used, in opposition to liquid ones wherein the egg yolk and white yolk are separated.

In the present invention, the eggs are fried before they become frozen or refrigerated. A foodstuff is fried when it has been cooked in edible fat, such as oil, butter or lard. An egg is fried when it has been cooked in edible fat and, as a result of the frying process, it retains the egg yolk in liquid form, such as a gel texture, while the edges of the egg white remain curdled and sometimes slightly burnt. During the whole frying process there is a fat film between the egg and the surface of the support in contact with the egg. The heat necessary for cooking the egg (in this case, for frying it) is transmitted to the egg by the fat, which in turn receives heat from the support. In opposition to fried eggs, grilled eggs are not cooked in edible fat. Occasionally the container on which grilled eggs are cooked might be impregnated with a bit of oil or butter. This oil or butter is not intended to work as heat transferring means for cooking the egg, or to have an impact on the taste or texture of the final product, but it simply prevents the foodstuff from being stuck to the pan or container. This oil or butter is normally consumed during the grilling process. Unlike fried eggs, grilled eggs usually have compact egg yolk (similar to the egg yolk in boiled eggs). Unlike fried eggs, in grilled eggs, the portion of the egg white in contact with the surface on which they are grilled is burnt or browned due to dehydration as a result of the absence of fat between the egg and the cooking surface.

Once the frozen fried eggs have been defrosted (or the refrigerated fried eggs are unpackaged), fried eggs are obtained, having the same characteristics as a recently made fried egg, that is to say, having the same texture, smell, color and taste.

According to an aspect of the present invention, there is provided a method for preparing frozen or refrigerated fried eggs from whole, fresh eggs, the method comprising: breaking whole, fresh eggs into a support impregnated with edible fat; introducing the support carrying the broken whole fresh eggs into an oven comprising ventilation means; heating the oven until the inner part of the yolk of the broken whole fresh eggs reaches a temperature of 65 to 73 (higher than 65 and lower than 73) degrees Celsius (from now on ° C.); taking said support carrying the eggs out of the oven, wherein said eggs are fried eggs; cooling the fried eggs for reducing their residual heat in order to prevent the inner part of the yolk from exceeding 73° C.; freezing or refrigerating the cooled fried eggs.

In a preferred embodiment, the oven is heated until the inner part of the yolk of the broken whole fresh eggs placed on the support introduced in the oven reaches a temperature of 67° C. to 72° C., still more preferably 69° C. to 71° C.

In a preferred embodiment, the step of cooling the fried eggs for reducing their residual heat is done by quickly forcing a reduction in the temperature of the fried eggs. In a more preferred embodiment, the step of quickly forcing a reduction in the temperature of the fried eggs is done by reducing the temperature of the fried eggs within the range of 0° C.$<T_{egg}<$20° C. Still more preferably, the temperature of the fried eggs is reduced within the range of 0° C.<$T_{egg}$<20° C. at a blast chiller.

In a particular embodiment, the support comprises a plurality of molds, wherein each mold is configured to receive one broken whole fresh egg.

In a particular embodiment, the edible fat is oil. In this case, the amount of used oil per egg is between 0.75 and 5.00 ml. More preferably, the amount of used oil per egg is between 1.00 and 4.00 ml. Still more preferably, the amount of used oil per egg is between 1.50 and 2.50 ml.

Alternative, the edible fat can be for example butter or lard. If the fat is butter or lard, a similar amount of fat (similar to the amount of oil) per egg is used.

In a particular embodiment, in order to guarantee that the temperature of the inner part of the egg yolk reaches a value within said range, the yolk temperature of at least one egg is monitored when the eggs are within the oven. The yolk temperature is preferably monitored by means of a thermocouple or a thermometer.

In a particular embodiment, the cooled fried eggs are refrigerated until their temperature is within the range of 0° C.<$T_{egg}$<8° C. The cooled fried eggs are then packaged and ready to be commercialized. The eggs may alternatively be packaged prior to their refrigeration. Preferably, at the stage of packaging, air is removed and inert gas is injected into the package.

In a particular embodiment, the cooled fried eggs are frozen until their temperature is within the range of −21° C.<$T_{egg}$<−18° C., after or before which the frozen fried eggs are packaged.

In a preferred embodiment, the cooled fried eggs are frozen in two stages: in a first freezing stage, the cooled fried eggs are gradually frozen until they reach a temperature within the range −18° C.<$T_{egg}$<−10° C. for a time period within the range of 2-6 hours; the frozen fried eggs then may be packaged; and in a second freezing stage, the frozen fried eggs keep on with the freezing process until the fried eggs reach a temperature within the range −21° C.<$T_{egg}$<−18° C.

The first freezing stage may be divided into two sub-stages: in a first sub-stage, the cooled fried eggs are frozen until they reach a temperature within the range −10° C.<$T_{egg}$<−3° C.; in a second sub-stage, the freezing of the product continues until the fried eggs reach a temperature within the range −18° C.<$T_{egg}$<−13° C. The eggs may be packaged after either the first or the second sub-stage.

The frozen or refrigerated fried eggs of the present invention can be commercialized both at an industrial level, for example for bars, restaurants and supermarkets, and at a domestic level.

Additional advantages and features of the invention will become apparent from the detail description that follows and will be particularly pointed out in the appended claims.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DESCRIPTION OF A WAY OF CARRYING OUT THE INVENTION

In this text, the term "comprises" and its derivations (such as "comprising", etc.) should not be understood in an excluding sense, that is, these terms should not be interpreted as excluding the possibility that what is described and defined may include further elements, steps, etc.

In the context of the present invention, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The following description is not to be taken in a limiting sense but is given solely for the purpose of describing the broad principles of the invention. Next embodiments of the invention will be described by way of example, with reference to the above-mentioned drawings showing apparatuses and results according to the invention.

Figure 1:
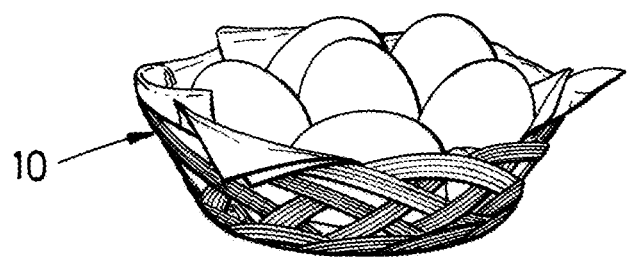
FIG. 1 shows whole, fresh eggs.
Figure 2:
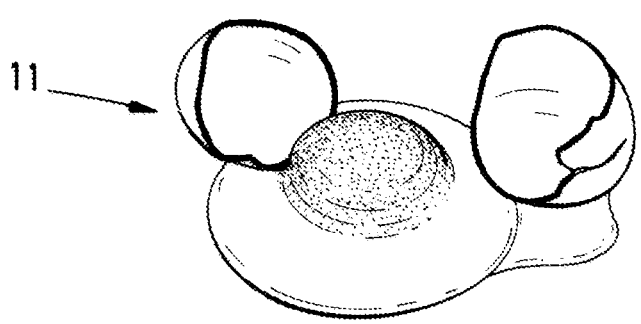
FIG. 2 shows a broken whole, fresh egg.
Figure 3:
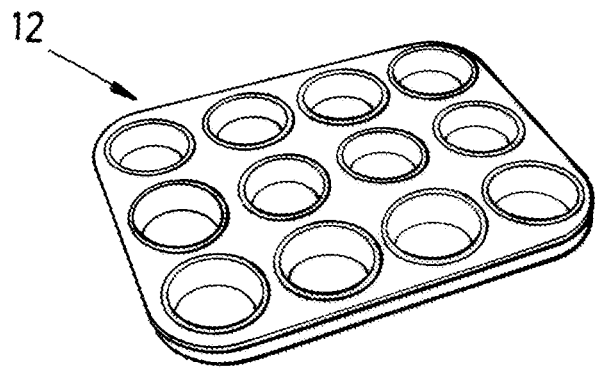
FIG. 3 shows a support configured to receive a plurality of broken eggs.

FIGS. 1-6 show in schematic form the different stages followed in order to obtain frozen fried eggs starting from whole, fresh eggs. If the goal is to obtain refrigerated fried eggs instead of frozen fried eggs, the stages are represented in FIGS. 1-5. As shown in FIG. 1, in order to achieve frozen or refrigerated fried eggs, whole, fresh eggs 10 are used. These eggs 10 are fresh and have not been exposed to any kind of transformation. Besides, the starting point is whole eggs 10 as laid by, for example, hens. The whole, fresh eggs 10 are broken 11 as shown in FIG. 2 into a support or container 12 (FIG. 3). From now on we use the term "support" intending to refer either to a support or to a container. The support 12 may be a mold or may comprise one or more molds, depending on the later configuration of the package in which they will be commercialized. For example, a support may have several molds, each of them being designed to receive one broken egg 11. FIG. 3 shows exemplary molds 12. These molds 12 are not limiting in shape, size or disposition. Rather, they must be taken as an exemplary embodiment of the type of molds that can be used. For example, the molds can be individual (single molds for corresponding single eggs) or a same surface can hold a plurality of molds, as shown in FIG. 3. The shape of the molds can be any desired one (round, square, oval, irregular, or any other). It is important to remark that the whole broken egg is deposited on a mold. In other words, the egg yolk is not separated from the egg white at any moment in the process of breaking the egg and depositing it on a mold. Besides, no additive is added to the egg.

Before the eggs are broken into the support, the surface of the support designed to become in contact with the eggs is impregnated with an amount of edible fat, such as oil, butter or lard. The amount of fat used is such that during the whole cooking process there is a fat film between the egg and the surface of the support in contact with the egg. Thanks to this fat film, the amount of heat required for cooking the egg is transmitted to the egg from (or through) the fat instead of directly from the support (as happens when preparing grilled eggs). In other words, heat is transmitted to the egg by the fat, which in turn receives heat from the support. The fat is not totally consumed when the egg is fried. On the contrary, after frying the egg there is still some fat left on the support. Due to this amount of remaining fat, the surface of the egg white in contact with the support is not burnt or browned. In a preferred embodiment, the edible fat is oil. When oil is used, an amount of between 0.75 ml and 5.00 ml of oil per egg is used, considering an average hen egg. More preferably, the amount of oil varies between 1.00 ml and 4.00 ml per egg. Still more preferably, the amount of oil varies between 1.50 ml and 2.50 ml per egg. In alternative embodiments, butter or lard can be used. When butter or lard is used, similar amounts of butter or lard per egg are preferably used.

Figure 4:
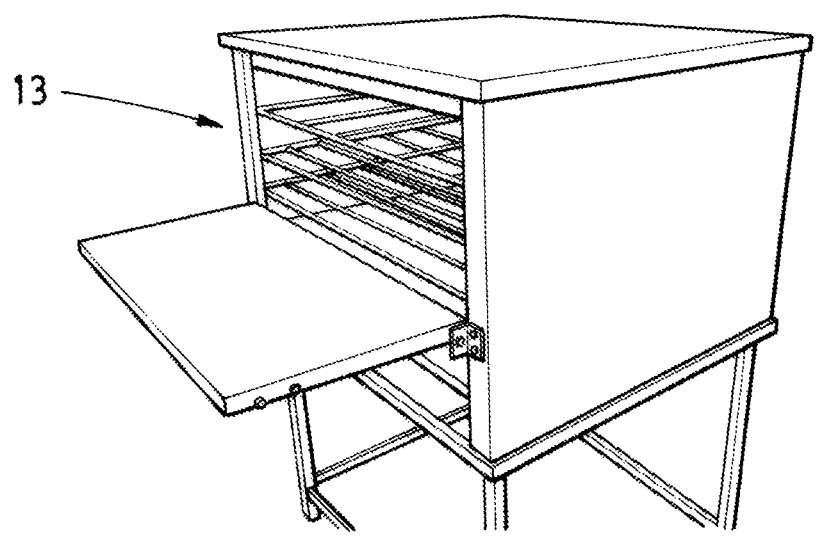
FIG. 4 shows an exemplar oven in which the broken whole, fresh eggs can be fried according to an embodiment of the present invention.

Once the eggs 11 have been deposited on the support 12 as explained in the previous paragraph, the support is introduced into an oven 13 as shown in FIG. 4. In a preferred embodiment, the oven has ventilation means in order to homogenize the temperature, such as a fan. A non-limiting type of ovens that can be used is a convection oven.

The eggs remain within the oven 13 for a time period and at a temperature such that the eggs become fried. In particular, the inventors have determined that an egg can be considered to be fried when the temperature of its yolk reaches between 65 and 73 degrees Celsius (65° C.<$T_{yolk}$<73° C.). In other words, the inventors have determined that an egg yolk becomes overcooked (it becomes solid rather than liquid or fluid) when its temperature is above 73° C. Therefore, the eggs remain within the oven for a period of time such that the egg yolks reach that temperature. In order to guarantee that the temperature of the inner part of the egg yolk reaches a value within the mentioned range, the yolk temperature is monitored by means of monitoring means. In a particular embodiment, a thermocouple or a thermometer is used. The temperature of the yolk is monitored either periodically or not periodically, such as randomly. Usually, when the support 12 holds a plurality of eggs 11, it is not necessary to monitor the temperature of all the eggs. On the contrary, monitoring the yolk temperature of several ones may be enough to estimate or deduce the yolk temperature of all the eggs in the oven. In other words, the yolk temperature of a group of eggs forming a representative amount of eggs is monitored. Furthermore, once the eggs are fried and taken out of the oven, additional quality controls are preferably carried out, in order to discard the eggs that do not fulfil the quality requirements (for example, when the control determines that the egg yolk is not liquid).

In a preferred embodiment, the inner part of the egg yolks must reach a temperature varying between 67 and 72 degrees Celsius (67° C.<$T_{yolk}$<72° C.). More preferably, the inner part of the egg yolks must reach a temperature varying between 69 and 71 degrees Celsius (69° C.<$T_{yolk}$<71° C.).

During the frying process the fat spread on the support reaches a maximum temperature of between 110 and 150° C. (degrees Celsius). More preferably, this maximum temperature varies between 120 and 140° C. Still more preferably, the maximum temperature of the fat spread on the support varies between 125 and 132° C.

Once it has been checked that the yolk temperature (temperature of the inner part of the yolk) is within the desired range (or subranges), the support carrying the eggs is taken out of the oven. At the moment of the extraction, the eggs disposed on the support are fried eggs, because the temperature of the inner part of their yolks is within the mentioned range (65° C.<$T_{yolk}$<73° C.). It is recalled that these fried eggs come from whole, fresh eggs, that is to say, each yolk has never been separated from its corresponding egg white. Nor has each yolk been mixed with its corresponding egg white. In other words, each egg has suffered no transformation apart from its breaking into a mold and its frying within the oven. Besides, no additive, such as citric acid or a substance comprising citric acid, has been added for achieving or contributing to the egg transformation into a fried egg.

Optionally the support can be preheated before the fat is spread thereon or the support can be preheated once the fat has been spread thereon.

Figure 5:
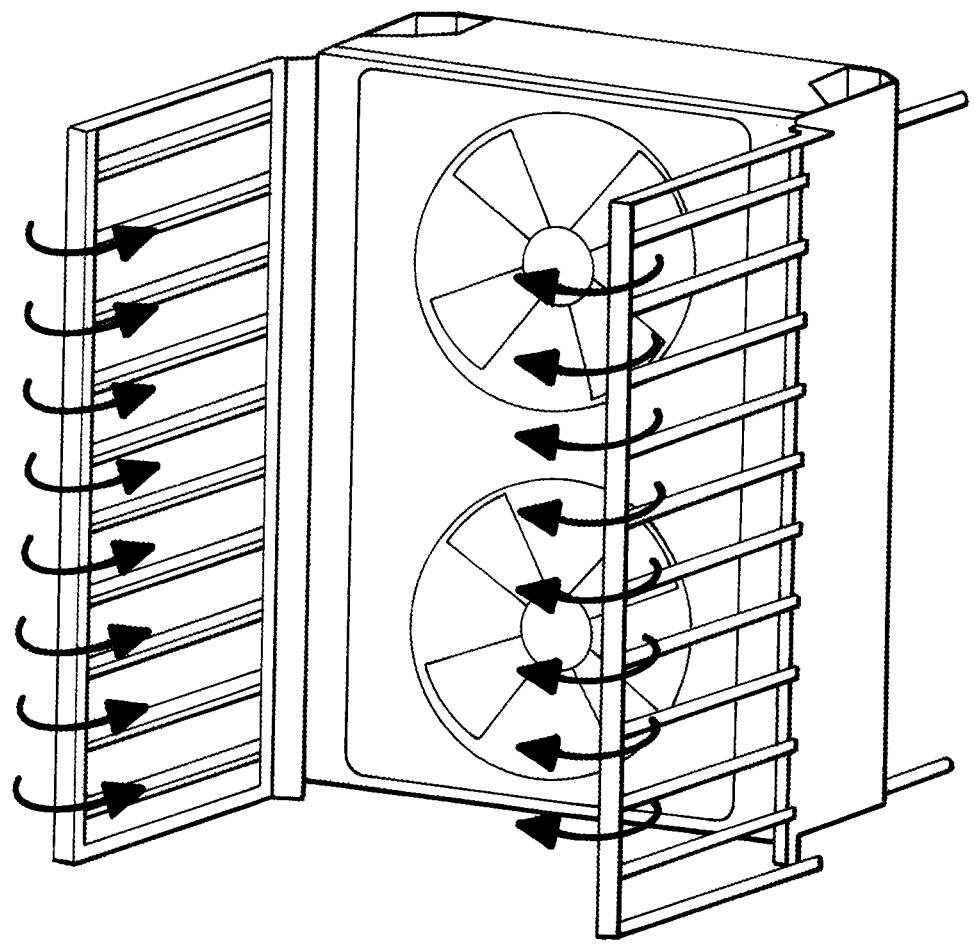
FIG. 5 shows an exemplar blast chiller in which forced refrigeration or cooling may be achieved immediately after the fried eggs are taken out of the oven according to an embodiment of the present invention.

The inventors have further determined that, once the egg yolk reaches the desired temperature, its residual heat may cause overcooking of the yolk, therefore overcooking the whole egg. For these reason, the eggs must be cooled immediately after their yolk temperature is at the desired value. In particular, the eggs are cooled in such a way that their yolk temperature is not above 73° C., preferably not above 72° C., and more preferably not above 70° C. In a particular embodiment, this is achieved by taking the eggs out of the heat source (and optionally out of the support or molds on which they have been fried). In a preferred embodiment, this is achieved by forced refrigeration (forced cooling) of the eggs. In this text, forced refrigeration or forced cooling refers to proactively cooling or refrigerating the fried eggs in order to reduce the temperature at which the fried eggs leave the oven, thus avoiding overcooking of the egg. Forced cooling may be done in specific machinery. In an preferred embodiment, this is achieved by taking the support carrying the eggs (the support on which they have been fried) to a zone providing industrial cold, preferably to a blast chiller, immediately after the frying process has been finished, that is to say, immediately after the temperature of the inner part of the yolk is within the mentioned range (65° C.<$T_{yolk}$<73° C.). FIG. 5 shows an exemplary blast chiller that may be used for reducing the temperature of the fried eggs immediately after leaving the oven. At the stage of forced cooling of the fried eggs immediately after they leave the oven in which they have been fried, the temperature of the fried eggs is reduced to a temperature to a temperature within the range of 0° C.<$T_{egg}$<20° C., preferably within the range of 0° C.<$T_{egg}$<10° C. and still more preferably within the range of 0° C.<$T_{egg}$<5° C. Thanks to this quick and forced reduction of temperature until the egg temperature is within the mentioned ranges, it is avoided that the residual heat in the fried eggs cause overcooking of the yolk after the extraction of the eggs from the oven, therefore overcooking the whole fried egg.

As explained, the quick and forced reduction in temperature is preferably achieved by introducing the support carrying the just fried eggs into a blast chiller which is at a negative temperature for the time required for quickly reducing the egg temperature. The amount of time within the blast chiller required for the fried eggs to reduce their temperature to a temperature within the mentioned range and the temperature required in the blast chiller for achieving such reduction depend on the type of blast chiller (capacity and power) and on the amount of fried eggs which temperature is to be reduced. In a particular embodiment, the temperature of the blast chiller varies within the within the range of $-40°$ C.$<T_{blast\ chiller}<-30°$ C., preferably within the range of $-40°$ C.$<T_{blast\ chiller}<-34°$ C. and still more preferably within the range of $-40°$ C.$<T_{blast\ chiller}<-36°$ C.

For example, the support carrying the just fried eggs is put into a blast chiller at a temperature of $-38°$ C. during 8 minutes. This guarantees that the fried eggs have a temperature within the range of $0°$ C.$<T_{egg}<20°$ C. after those 8 minutes. As said, the temperature of the blast chiller and required time for the temperature reduction varies depending on the amount of product to be cooled down and on the power of the blast chiller.

Once the fried eggs have been quickly cooled down, preferably by forced refrigeration or forced cooling in a blast chiller, therefore guaranteeing that they are fried and not overcooked (the yolk temperature has been controlled in order to guarantee that the yolk is liquid), the eggs can be frozen or refrigerated.

If at the stage of quick forced cooling of the fried eggs the temperature of the fried eggs is reduced to a temperature within the range of $0°$ C.$<T_{egg}<8°$ C., then the cooled fried eggs are already refrigerated. This temperature must be kept stable, preferably between 0 and $5°$ C. The refrigerated fried eggs can then be immediately packaged and ready to be commercialized. If, on the contrary, at the stage of quick forced cooling of the fried eggs the temperature of the fried eggs is reduced to a temperature above refrigeration (for example within the range of $8°$ C.$<T_{egg}<20°$ C.), the cooled fried eggs must be further refrigerated (temperature within the range of $0°$ C.$<T_{egg}<8°$ C., preferably between $0°$ C. and $5°$ C.) and can then immediately be packaged and ready to be commercialized. In an alternative embodiment, the cooled fried eggs are packaged prior to being refrigerated. At the stage of packaging, air is preferably removed and inert gas, such as nitrogen, is preferably injected into the package in order to prevent air from ruining the cooled fried eggs. The packaged refrigerated fried eggs can maintain their properties up to 18 days approx. They are ready to be stored and commercialized.

Figure 6:
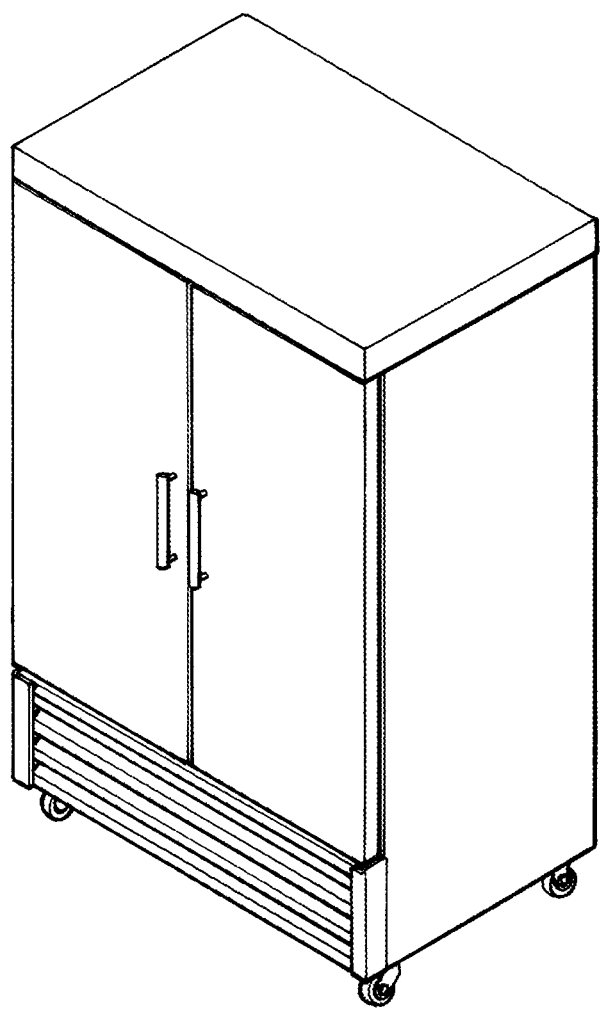
FIG. 6 shows an exemplar freezer in which cooled fried eggs may be inserted according to an embodiment of the present invention.

Next an alternative embodiment is described, in which once the fried eggs have been quickly cooled down, preferably by forced refrigeration or forced cooling in a blast chiller, the cooled fried eggs are frozen instead of refrigerated. FIG. 6 shows an exemplar freezer in which cooled fried eggs may be frozen prior to their packaging. In this embodiment, once the temperature of the fried eggs has been forcedly and quickly reduced within the range of $0°$ C.$<T_{egg}<20°$ C., preferably within the range of $0°$ C.$<T_{egg}<10°$ C. and still more preferably within the range of $0°$ C.$<T_{egg}<5°$ C., a process of freezing is carried out. The freezing process must be done gradually and smoothly in order not to damage the fried eggs (not to damage their texture, structure and taste), until the final temperature of the fried eggs is within the range of $-21°$ C.$<T_{egg}<-18°$ C. For example, overfreezing a fried egg may cause its burning. The process of freezing the cooled fried eggs may be done in a blast chiller as shown for example in FIG. 5 or in a freezer as shown for example in FIG. 6. For this reason, the cooled fried eggs are preferably frozen in two stages:

In a first freezing stage, the cooled fried eggs are frozen, for example in a blast chiller being at temperatures within the range of $-40°$ C.$<T_{blast\ chiller}<-30°$ C., preferably within the range of $-40°$ C.$<T_{blast\ chiller}<-34°$ C. and still more preferably within the range of $-40°$ C.$<T_{blast\ chiller}<-36°$ C., until they reach a temperature within the range $-18°$ C.$<T_{egg}<-10°$ C., preferably within the range $-15°$ C.$<T_{egg}<-13°$ C. This process must be slow and gradual, preferably for a time period within the range of 2-6 hours, more preferably within the range of 3-5 hours. The frozen fried eggs can then be packaged. Obviously the packaging can be made in any time of the freezing stage.

In an alternative embodiment of this first freezing stage, the first freezing stage is divided in two sub-stages, for example in a freezer at similar temperatures as the ones mentioned above: In the first sub-stage, the cooled fried eggs are frozen until they reach a temperature within the range $-10°$ C.$<T_{egg}<-3°$ C., preferably within the range $-8°$ C.$<T_{egg}<-5°$ C. At this moment the product may be packaged. In the second sub-stage, the freezing of the product continues until the fried eggs reach a temperature within the range $-18°$ C.$<T_{egg}<-10°$ C., preferably within the range $-15°$ C.$<T_{egg}<-13°$ C. If the fried eggs have not been packaged after the first sub-stage, they may be packaged now.

In a second freezing stage, the frozen fried eggs keep on with the freezing process until the fried eggs reach a temperature within the range $-21°$ C.$<T_{egg}<-15°$ C., preferably within the range $-21°$ C.$<T_{egg}<-18°$ C. As it can be observed, the freezing process is preferably started prior to the packaging of the fried eggs. After this second freezing stage, the fried eggs are correctly frozen and ready to be stored and commercialized. In conclusion, the proposed method permits to prepare frozen or refrigerated fried eggs obtained from whole, fresh eggs, without performing any additional transformation in the eggs, such as mixing egg yolk and egg white or separating egg yolk and egg white for independent manipulation of them, or using additives or using liquid egg. The amount of fat to be spread on the frying support is selected so as to guarantee that the eggs become fried and not grilled. During the frying process of the eggs, it is verified that the eggs become fried by controlling the yolk temperature. Thus, it is guaranteed that the eggs become fried (that is to say, they have liquid yolk). Additionally, once fried, it is verified that the yolk is not overheated (that is to say, it has not become boiled or overcooked). The eggs are refrigerated or frozen after verification that the yolk keeps on being liquid, that is to say, the egg maintains its fried state (as it was when it was taken out of the oven). This is achieved by forcing the cooling of the fried eggs immediately after they leave the oven in which they have been fried, unlike in prior art disclosures, such as US2003/0118714A1, in which a formulated fried egg is cooled at room temperature and therefore the formulated fried egg becomes overcooked.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A method for preparing frozen or refrigerated fried eggs from whole, fresh eggs, the method comprising:
   breaking whole, fresh eggs into a support impregnated with edible fat;
   introducing the support carrying the broken whole fresh eggs into an oven comprising ventilation means;
   heating the oven until the inner part of the yolk of the broken whole fresh eggs reaches a temperature of 65 to 73° C., wherein heat for cooking the eggs is transmitted to the eggs by the edible fat;
   taking said support carrying the eggs out of the oven, wherein said eggs are fried eggs;

cooling the fried eggs for reducing their residual heat in order to prevent the inner part of the yolk from exceeding 73° C. by quickly forcing a reduction in the temperature of the fried eggs within the range of 0° C.<$T_{egg}$<20° C.;

freezing the cooled fried eggs until their temperature is within the range of −21° C.<$T_{egg}$<−18° C., or refrigerating the cooled fried eggs until their temperature is within the range of 0° C.<$T_{egg}$<8° C. if the cooled fried eggs were at a temperature within the range of 8° C.<$T_{egg}$<20° C.

2. The method of claim 1, wherein the oven is heated until the inner part of the yolk of the broken whole fresh eggs placed on the support introduced in the oven reaches the temperature of 67 to 72° C.

3. The method of claim 2, wherein the oven is heated until the inner part of the yolk of the broken whole fresh eggs placed on the support introduced in the oven reaches the temperature of 69 to 71° C.

4. The method of claim 1, wherein the temperature of the fried eggs is reduced within the range of 0° C.<$T_{egg}$<20° C. at a blast chiller.

5. The method of claim 1, wherein said support comprises a plurality of molds, wherein each mold is configured to receive one broken whole fresh egg.

6. The method of claim 1, wherein said edible fat is oil.

7. The method of claim 6, wherein the amount of used oil per egg is between 0.75 and 5.00 ml.

8. The method of claim 7, wherein the amount of used oil per egg is between 1.00 and 4.00 ml.

9. The method of claim 8, wherein the amount of used oil per egg is between 1.50 and 2.50 ml.

10. The method of claim 1, wherein said edible fat is butter or lard.

11. The method of claim 1, wherein in order to guarantee that the temperature of the inner part of the egg yolk reaches a value within said range, the yolk temperature of at least one egg is monitored when the eggs are within the oven.

12. The method of claim 11, wherein the yolk temperature is monitored by means of a thermocouple or a thermometer.

13. The method of claim 1, wherein after refrigerating the cooled fried eggs are packaged and ready to be commercialized.

14. The method of claim 13, wherein at the stage of packaging, air is removed and inert gas is injected into the package.

15. The method of claim 1, wherein the stage of freezing the cooled fried eggs is done by freezing the cooled fried eggs in two stages:

in a first freezing stage, the cooled fried eggs are gradually frozen until they reach a temperature within the range −18° C.<$T_{egg}$<−10° C. for a time period within the range of 2-6 hours;

in a second freezing stage, the frozen fried eggs keep on with the freezing process until the fried eggs reach a temperature within the range −21° C.<$T_{egg}$<−18° C.

16. The method of claim 15, wherein said first freezing stage comprises:

in a first sub-stage, the cooled fried eggs are frozen until they reach a temperature within the range −10° C.<$T_{egg}$<−3° C.;

in a second sub-stage, the freezing of the product continues until the fried eggs reach a temperature within the range −18° C.<$T_{egg}$<−13° C.

* * * * *